US012578568B2

(12) United States Patent
Aggarwal et al.

(10) Patent No.: US 12,578,568 B2
(45) Date of Patent: Mar. 17, 2026

(54) HYPERSPECTRAL MICROSCOPY USING A PHASE MASK AND SPECTRAL FILTER ARRAY

(71) Applicant: THE REGENTS OF THE UNIVERSITY OF CALIFORNIA, Oakland, CA (US)

(72) Inventors: Neerja Aggarwal, Richmond, CA (US); Laura Waller, Orinda, CA (US); Yashovardhan Raniwala, Berkeley, CA (US); Eric Markley, Berkeley, CA (US); Kristina Monakhova, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 11 days.

(21) Appl. No.: 18/629,189

(22) Filed: Apr. 8, 2024

(65) Prior Publication Data

US 2024/0337824 A1     Oct. 10, 2024

Related U.S. Application Data

(60) Provisional application No. 63/458,118, filed on Apr. 8, 2023.

(51) Int. Cl.
G02B 21/36          (2006.01)
G02B 27/09          (2006.01)
(Continued)

(52) U.S. Cl.
CPC ....... G02B 21/365 (2013.01); G02B 27/0938 (2013.01); G06T 15/00 (2013.01); H04N 23/55 (2023.01)

(58) Field of Classification Search
CPC .. G02B 21/365; G02B 27/0938; G06T 15/00; H04N 23/55
See application file for complete search history.

(56)          References Cited

U.S. PATENT DOCUMENTS

2014/0375792 A1* 12/2014 Yaqoob ................ G01N 21/453
                                                                    348/79
2019/0204577 A1*  7/2019 Faris .................. G02B 21/0088
                    (Continued)

OTHER PUBLICATIONS

Monakhova, Kristina, et al., "Spectral DiffuserCam: lensless snapshot hyperspectral imaging with a spectral filter array", Optical Society of America, vol. 7, No. 10, Oct. 2020, pp. 1-10.
(Continued)

*Primary Examiner* — Nasim N Nirjhar
(74) *Attorney, Agent, or Firm* — O'BANION & RITCHEY LLP; John P. O'Banion

(57)          ABSTRACT

A snapshot hyperspectral imaging camera assembly and processing methods are provided that has a higher achievable resolution than a traditional snapshot imager. The camera assembly is compact and can be attached to the output port of any traditional benchtop microscope. This camera assembly has a relay lens that relays the Fourier plane from the microscope onto a phase mask that encodes the spatial information of the target, and a spectral filter array that encodes the spectral information of the target. Measurements are processed with a compressed sensing algorithm and an optimization algorithm to reconstruct a 3D hypercube from 2D intensity measurements.

16 Claims, 3 Drawing Sheets

(51) Int. Cl.
  *G06T 15/00*  (2011.01)
  *H04N 23/55*  (2023.01)

(56)  References Cited

U.S. PATENT DOCUMENTS

| | | | | |
|---|---|---|---|---|
| 2022/0364917 A1* | 11/2022 | Houck | .................. | G02B 5/288 |
| 2023/0043414 A1* | 2/2023 | Pinkard | .................. | G02B 21/06 |
| 2023/0124259 A1* | 4/2023 | Mehta | ............... | G01N 21/6458 |
| | | | | 356/364 |
| 2024/0085241 A1* | 3/2024 | Zhan | .................. | G02B 27/0068 |

OTHER PUBLICATIONS

Zhou, Lanlan, et al., "Multispectral Fluorescence Imaging," Journal of Nuclear Medicine, vol. 50, Issue 10, 2009, pp. 1563-1566.
Feng, Yinnian, et al., "MRBLES 2.0: High-throughput generation of chemically functionalized spectrally and magnetically encoded hydrogel beads using a simple single-layer microfluidic device," Microsystems & Nanoengineering, vol. 6 , Issue 109, 2020, pp. 1-13.
Sinclair, Michael B., "Hyperspectral Confocal Microscope," Applied Optics, vol. 45, 2006, pp. 6283-6291.
Wu, Jiamin, et al. "Snapshot Volumetric Hyperspectral Micros-copy," Scientific Reports, 2016, pp. 1-10.
Yu, Changben, et al. "Research on spectral reconstruction algorithm for snapshot microlens array micro-hyperspectral imaging system." Optics Express, vol. 29, Issue 17, 2021, pp. 26713-26723.
Cull, Christy Fernandez, et al "Identification of fluorescent beads using a coded aperture snapshot spectral imager." Optics Express, vol. 49, No. 10, Apr. 1, 2021, pp. B60-B70.

\* cited by examiner

HYPERSPECTRAL MICROSCOPY USING A PHASE MASK AND SPECTRAL FILTER ARRAY

CROSS-REFERENCE TO RELATED APPLICATIONS

This application claims priority to, and the benefit of, U.S. provisional patent application Ser. No. 63/458,118 filed on Apr. 8, 2023, incorporated herein by reference in its entirety.

STATEMENT REGARDING FEDERALLY SPONSORED RESEARCH OR DEVELOPMENT

This invention was made with government support under Contract No. 1351896 awarded by the National Science Foundation. The government has certain rights in this invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to microscopes and microscopy and more particularly to hyperspectral microscopy devices and methods providing high temporal and spatial resolution snapshot hyperspectral microscopy capabilities. An architecture for a computational snapshot hyperspectral imager is presented that can be attached to the output port of any traditional benchtop microscope. The camera assembly contains few components and is compact.

2. Background Discussion

Hyperspectral imaging (HSI) is an imaging technique that captures the spectral response for every point in the scene. It has applications in remote sensing, agriculture, medical imaging, and fluorescence microscopy, for example.

A hyperspectral image is typically presented in the form of a 3-dimensional data cube (x, y and A), where x and y represent two spatial dimensions of the scene, and the A represents the spectral dimension including a range of wavelengths. A hyperspectral image captures the intensity for every pixel across a range of wavelengths with high spectral resolution, giving both spatial and spectral information contained in the scene.

HSI systems can be broadly classified into scanning-based systems and snapshot systems. Scanning systems may be classified into spatial scanning systems and spectral scanning systems. Spatial scanning-based systems acquire data by scanning through the scene with a sensor that captures all of the spectral information at every point (or line). Analogously, spectral scanning systems capture the entire scene for a particular spectral band and scan through all the desired spectral bands to capture the data cube. Such systems can achieve high spatial and spectral resolution but cannot be used in applications that require high temporal resolution such as imaging dynamic scenes.

Snapshot HSI systems capture the hyperspectral data of a scene in a single acquisition. A number of applications require a snapshot HSI system with high acquisition speeds. However, these systems typically have lower spatial-spectral resolution than the scanning-based systems. They are also often bulky, expensive, have a number of additional components, and are hard to couple into existing bench-top microscopes.

This results in reduced accessibility to these systems due to price, long lead times, and a lack of access to custom fabrication tools.

Snapshot hyperspectral methods eliminate scanning to improve temporal resolution, but these systems usually require a tradeoff between spatial resolution and spectral resolution. High spatial resolution is important, for example, in biology. Poor spatial resolution can make it difficult to see inside cells, or track particles. Poor spectral resolution can make it difficult to unmix fluorophores or detect spectral shifts inside cells. Thus, there is a need for high resolution snapshot hyperspectral microscopy techniques with both high temporal and spatial-spectral resolutions.

BRIEF SUMMARY

An apparatus, system and methods are provided for snapshot hyperspectral microscopy that eliminates scanning and overcomes the tradeoff between spatial and spectral resolution. The system decouples the spatial and spectral encoding, which allows the system to circumvent the classical spatial-spectral resolution trade-off that is experienced by traditional snapshot HSI systems. The system architecture may also improve resolution by using a compressed sensing approach.

The system is compact, requires only 4 additional components (relay lens, diffuser, spectral filter, image sensor), and can be coupled to the output port of existing bench-top microscopes easily. This provides a substantially smaller form factor and lower potential cost compared to hyperspectral confocal microscopes.

In one embodiment the technology involves placing a lens, phase mask, and spectral filter array at the output port of a microscope before the image sensor. The phase mask, also known as a diffuser, spreads out the light from each point in the object such that the light passes through multiple spectral filters on the image sensor. The point spread function thus created has a sharp auto correlation that can be used to recover a higher resolution spectral datacube. The detected measurement is fed through an algorithm to solve an inverse problem to recover the hyperspectral data cube.

The imager preferably comprises a diffuser and spectral camera with an image sensor with a 64-channel tiled spectral filter array that is placed in the Fourier plane of the imaging system using a relay lens. The diffuser enables each spatial point from the object to map onto all the spectral filter channels at once and generates a spatially-varying caustic pattern, which encodes the lateral position of the point. Hence, it is possible to computationally reconstruct the object's 2D spatial information and the full spectral information for each pixel using a sparsity-constrained inverse problem. The computational snapshot HSI system preferably utilizes a compressed sensing theory to algorithmically reconstruct a 3D scene from a 2D measurement.

In one embodiment, an off-the-shelf image sensor with a protective cover glass removed is used and the spectral filter array placed right on top on the imaging sensor.

In another embodiment, the spectral filter array is placed right on top of the protective cover glass of an off-the-shelf imaging sensor.

In another embodiment, the spectral filter is placed right behind the diffuser allowing the use of any off-the-shelf imaging sensor without modification.

This snapshot hyperspectral imaging camera assembly provides a higher achievable resolution than a traditional snapshot imager and is attached easily to the output port of any traditional benchtop microscope Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Referring more specifically to the drawings, for illustrative purposes, devices and methods for snapshot hyperspectral microscopy are generally shown. Several embodiments of the technology are described generally in FIG. 1 to FIG. 4 to illustrate the characteristics and functionality of the for snapshot hyperspectral microscope apparatus and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
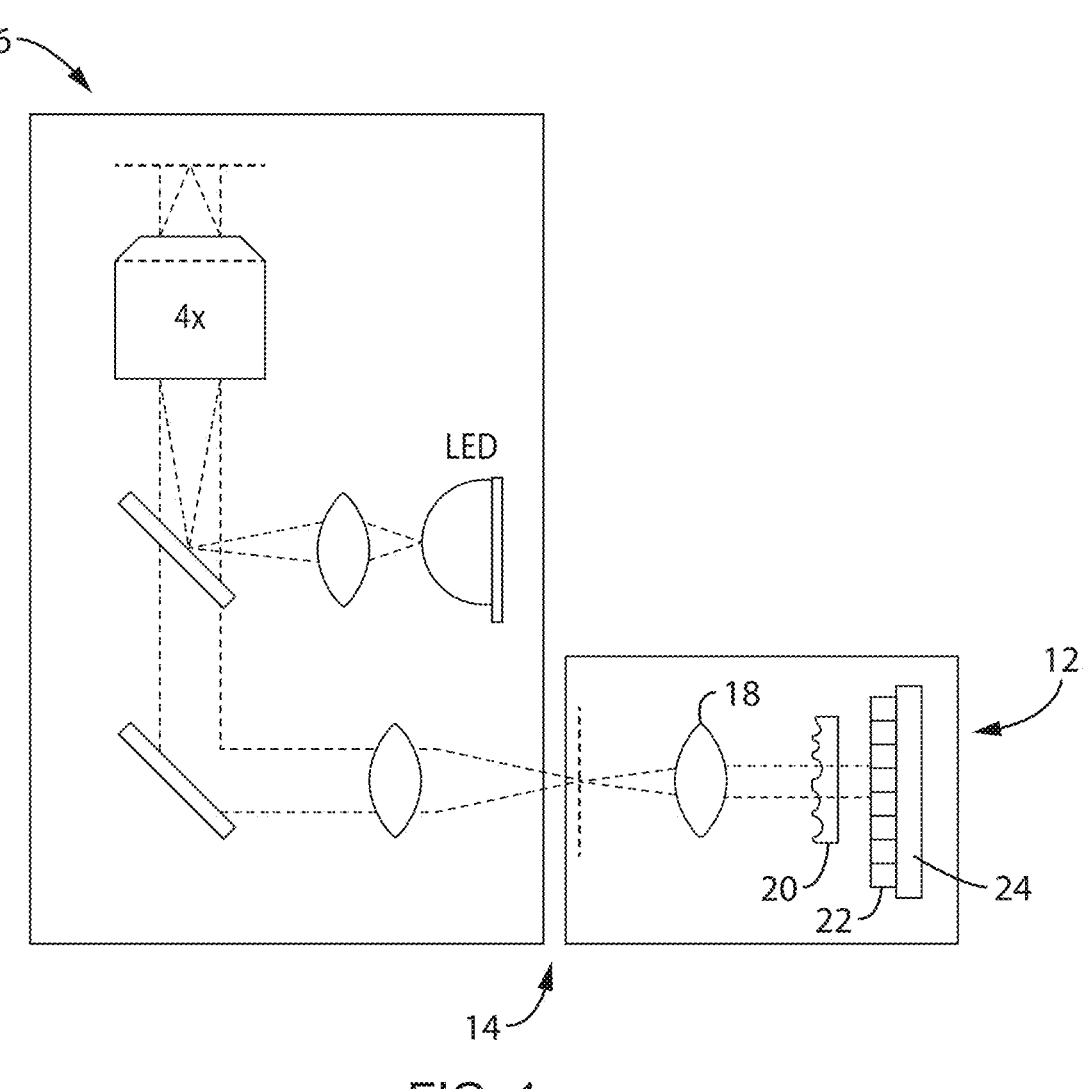
FIG. 1 is a schematic illustration of a snapshot hyperspectral microscope architecture with a relay lens to relay the Fourier plane from inside the microscope, a diffuser placed in the Fourier plane, followed by a spectral filter array and an imaging sensor. according to one embodiment of the technology.

Turning now to FIG. 1, one embodiment of the snapshot HIS system 10 with an imaging module 12 coupled to an output 14 of a desktop microscope 16 is shown schematically. The imaging module 12 in this embodiment has a relay lens 18 configured to relay the Fourier plane from inside the microscope 16 to a diffuser 20 placed in the Fourier plane, followed by a spectral filter array 22 and an imaging sensor 24. The system 10 uses multiplexed measurements and compressed sensing theory to exploit the sparsity in various samples, with an optimization algorithm to reconstruct a 3D hypercube from a 2D intensity measurement.

The optical diffuser 20 helps in multiplexing information from the scene. An optical diffuser 12 is a device that scatters light without impacting its spectral composition. Optical diffusers are commonly used in various applications, such as photography, lighting, and display technology. There are a variety of diffusers for different applications like ground glass diffusers, holographic diffusers, and micro-lens arrays known in the art. However, holographic light shaping diffusers are the most preferred diffusers 20 used in the HSI system. This is a class of diffusers that are designed to control the spatial distribution of light and shape the light into a desired pattern. Preferred diffusers 20 have the characteristic of linear shift invariance which is observed in weakly scattering diffusers. Consequently, it is possible to model the diffuser using a convolution with its impulse response, which is called the Point Spread Function (PSF) of the diffuser. Intuitively, this means that the PSF moves around as the point source is moved laterally and axially.

Another important component of the imaging system is the spectral filter 22 that is used for spectral sampling of the hypercube for reconstruction. Preferred spectral filters are matched to the fluorescence spectra of the samples. Preferred filters are usually 10-100 in count, depending on the desired spectral resolution, and between 300 nm to 900 nm in bandwidth. The filters may have narrow bandpass transmission as commonly used in fluorescence microscopy. Or they can have broadband transmission that is orthogonal between filters. The spectral filter element much be designed and placed so that the PSF from the diffuser hits each individual filter.

In summary, the system 10 architecture takes a multiplexed 2D intensity measurement on the sensor 24 and uses compressed sensing theory to reliably recover the 3D hypercube, given that the scene is sparse in some known domain. The relay lens 18 relays the Fourier plane from the microscope 16 onto the diffuser 20, the diffuser 20 encodes the spatial information in the scene, and the spectral filter array 24 encodes the spectral information in the scene.

The relay lens 18 allows access to the Fourier plane from outside of the microscope. This is followed by the diffuser 20 which is placed in the Fourier plane of the imaging system and plays the role of the multiplexer. The diffuser maps a point in the scene to a pseudo-random pattern on the image sensor called the Point Spread Function (PSF) of the diffuser. It is possible to track the movement of this pattern very accurately and hence the localization of a point in the scene.

Figure 2:
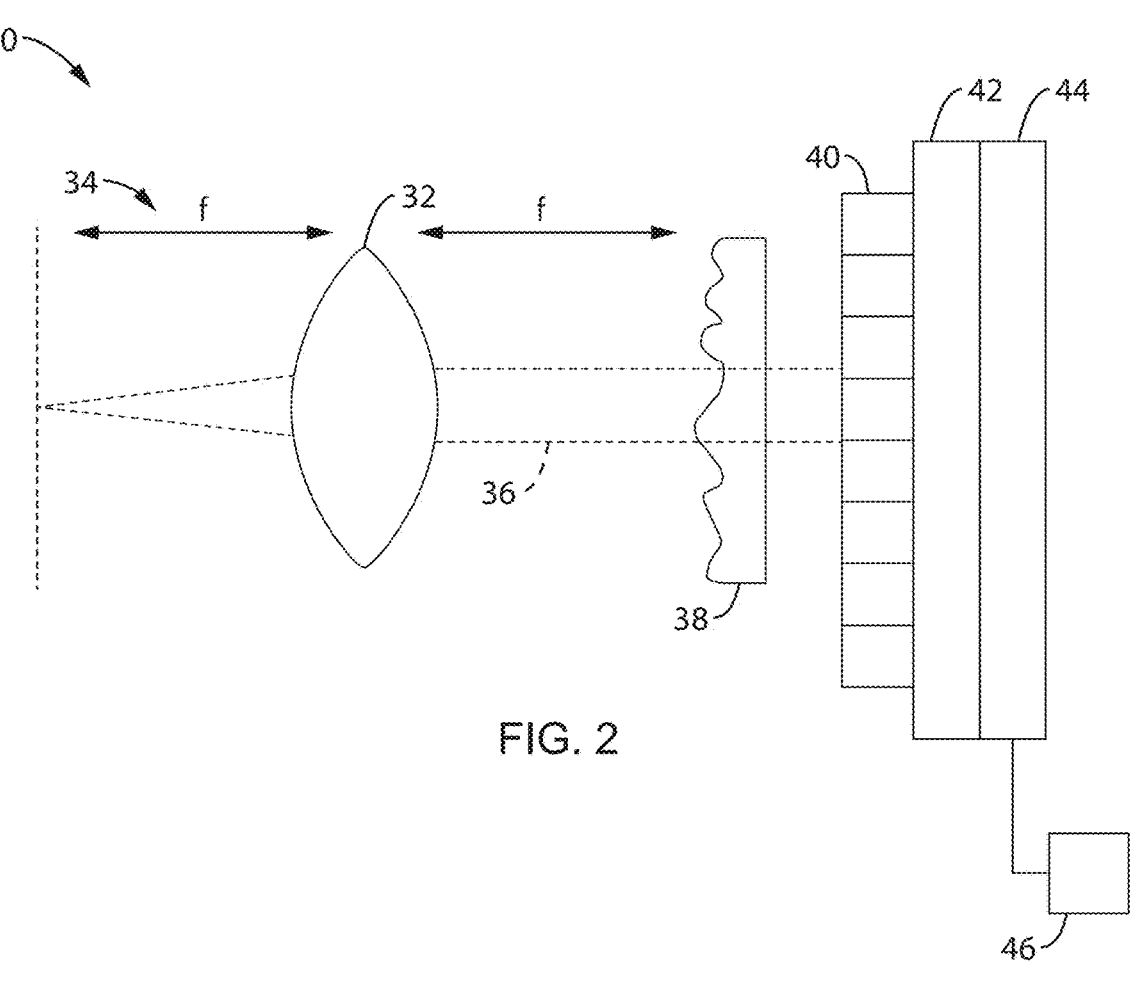
FIG. 2 is a schematic illustration of an alternative snapshot hyperspectral microscope architecture of FIG. 1 with the spectral filter array coupled to a cover glass of the imaging sensor according to one embodiment of the technology.

Referring now to FIG. 2, an alternative embodiment of the modular system apparatus 30 is shown schematically. Rather than attaching the module to a benchtop microscope, the system is used directly to image microscopic particles, making it more compact and portable for field deployment. In contrast to mounting the spectral filter to the sensor, the spectral filter 40 is placed on top of the cover glass 42 of a sensor 44 making it easier to fabricate and allowing the use of off-the-shelf components and allowing for any image sensor to be used.

In this embodiment, the structure 30 has a relay lens 32 that relays the Fourier plane 34 from the microscope onto the diffuser 38, the diffuser 38 encodes the spatial information 36 in the scene, and the spectral filter array encodes the spectral information in the scene.

This simplification can be made by modifying the reconstruction algorithm to account for the extra space between the spectral filter and the image sensor. This can be done by using Fresnel propagation and more thorough calibration of the angle dependence introduced into the spectral filter transmission. The signal processing and evaluation is made with programming and processor 46. This embodiment is further described in Example 1.

Figure 3:
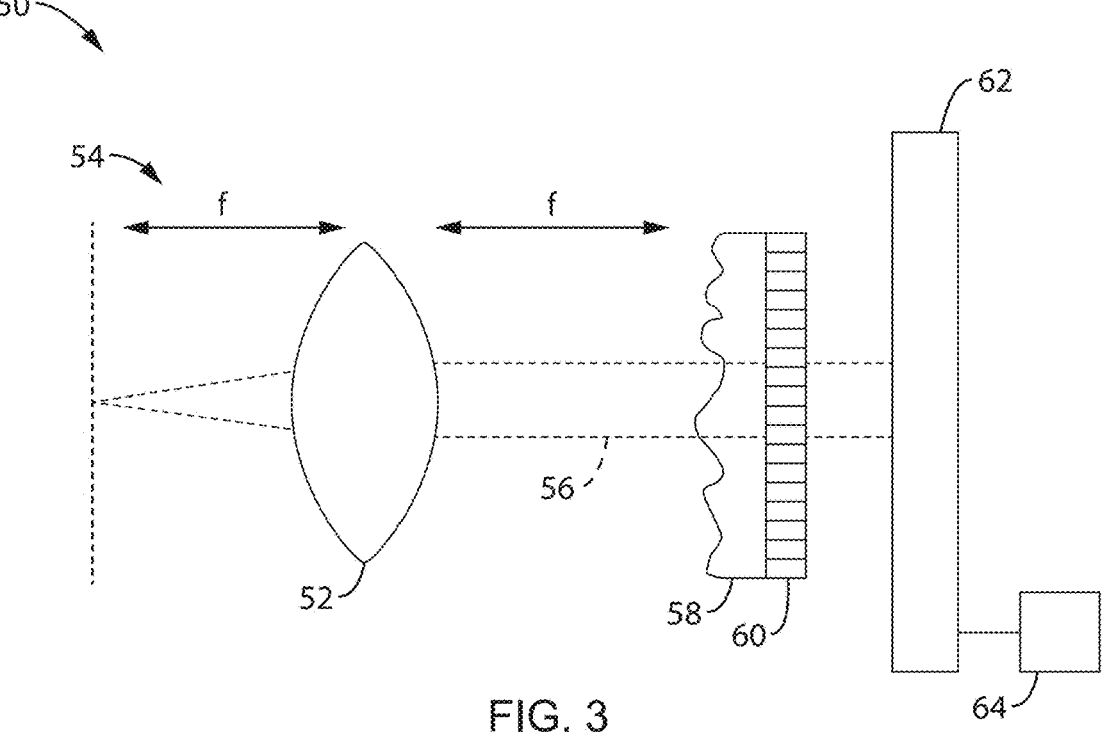
FIG. 3 is a schematic illustration of an alternative snapshot hyperspectral microscope architecture of FIG. 1 with the spectral filter array coupled to the back surface of the diffuser according to one embodiment of the technology.

A second alternative embodiment of the modular system apparatus 50 is shown in FIG. 3. In this embodiment, the apparatus coupled to a microscope has a relay lens 52 at a designated position 54 delivers a data 56 to a diffuser 58 with a spectral filter 60 mounted to the diffuser 58. This placement of the spectral filter 60 right behind the diffuser 58 allows the decoupling of the hyperspectral nature of the system from the sensor 62, allows for any image sensor 62 to be used in the design. The combination of the diffuser 58 with the spectral filter 60 relocates the spectral filter array 60 from the image sensor plane to the diffuser plane. By moving the spectral filter array to the diffuser plane the apparatus can completely circumvent the custom fabrication problem presented by the initial design.

The design is simple to fabricate, allows for a free choice of the imaging sensor based on the application for the imaging system, and avoids gluing a spectral filter 60 onto the sensor 62 which is useful for applications with expensive cameras. This design can potentially be a modular attachment that can be coupled into any imaging system to make it an HSI system.

The sensor measurements, reconstructions and imaging are controlled and processed by a computer and programming e.g., 46, 64. The system structures of each of these three embodiments generally take a multiplexed 2D intensity measurement on the sensor and uses a compressed sensing theory to reliably recover the 3D hypercube for imaging.

Compressed sensing (CS) is a signal processing technique that enables acquisition of high-quality signals with fewer measurements by exploiting the underlying structure of the signal to reconstruct it faithfully. Traditionally, acquiring a signal includes taking measurements at a high sampling rate (as per the Shannon-Nyquist sampling theorem) to guarantee that all of the information in the signal is captured. Signals, however, are often compressible, i.e., they can be represented by a limited number of non-zero coefficients in a suitable basis.

The programing spreads out the sparse information contained in the signal by multiplexing and the multiplexed measurements can be sub-sampled. The measurements are then processed using advanced algorithms to recover the underlying signal with high accuracy. One of the key benefits of CS is that it can significantly reduce the acquisition time and/or the data storage requirements, which is particularly useful for high-speed or high-resolution imaging applications.

This technique is particularly useful in cases where the signals have some common structure. For instance, when signals have similar sparsity patterns in a certain domain, we can design a multiplexed measurement scheme to reduce the number of measurements required to faithfully reconstruct the signal.

To use CS, the methods multiplex measurements and sub-sample them in the multiplexed domain. The scene to be imaged is reconstructed by solving an inverse problem by using a set of measurements to estimate the scene that would result in those measurements.

The inverse problem for the system boils down to an optimization problem, however. Convexity is a property of a function that means it is always "bowed" upwards, and its curvature does not change in any direction. This property ensures that the function has only one local minimum which is also the global minimum—the point where the function has its lowest value.

In practice, such inverse problems need to be solved iteratively since these problems seldom have closed form solutions. However, traditional gradient descent with a fixed step size takes long to converge. Instead, a FISTA algorithm is preferably used, which is an iterative algorithm for solving convex optimization problems.

The FISTA algorithm is a modification of the classic iterative shrinkage-thresholding algorithm (ISTA) that achieves faster convergence rates. ISTA is a first-order gradient-based algorithm that updates the solution by taking a gradient step and then applying a thresholding operation to enforce sparsity constraints. The thresholding operation sets coefficients of the solution that are smaller than a given threshold to zero. The FISTA algorithm builds on ISTA by adding a momentum term that accelerates the convergence of the algorithm. The momentum term allows the algorithm to take larger steps in the direction of the gradient, which can improve convergence. Additionally, FISTA uses a line search to determine the step size, which can lead to better convergence rates than fixed step sizes.

A forward model incorporating these features is used for processing and reconstruction. As mentioned above, the diffuser helps encode the lateral position of the points in the image plane of the microscope. Each point in the scene creates this caustic pattern onto the sensor that produces the measurement. As a point moves in the scene, the caustic pattern shifts up and down, but does not change. This indicates that the system is linear shift-invariant. So it is possible to model this as a convolution just like a traditional microscope.

Figure 4:
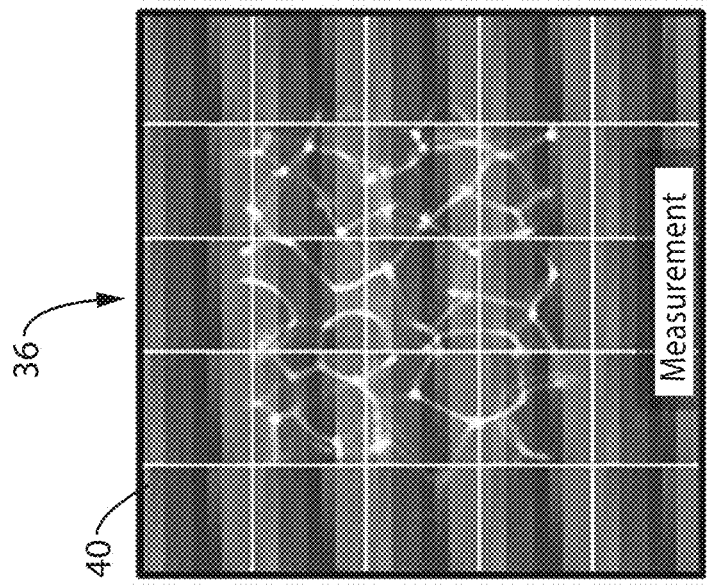
FIG. 4 is a schematic diagram of a controllable pattern from the diffuser imposed on the spectral filter array. The caustic pattern is large enough that it lands on nearly all the spectral filters of the array. Each spectral filter transmits light depending on the wavelength, and so it is possible to reconstruct the spectrum based on which pixels light up on the sensor.
Figure 4:
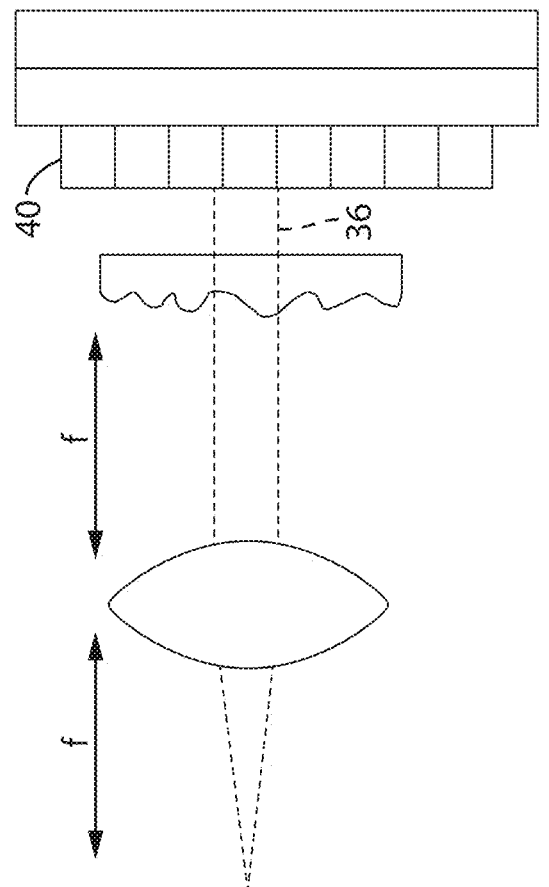

The caustic pattern is large enough that it lands on all the spectral filters. A pattern from the phase mask/diffuser imposed on a spectral filter array is illustrated in FIG. 4. Each spectral filter transmits light depending on the wavelength, and so it is possible to reconstruct the spectrum based on which pixels light up on the sensor. Consequently, the light from the scene passing through the diffuser can be modeled as a 2D convolution with the diffuser's PSF expressed as the following:

$$B_1(x, y, \lambda) = H(x, y) * V(x, y, \lambda).$$

Here, $B_1$ represents the intermediate measurement after the light has only passed through the diffuser, H refers to the diffuser PSF and V is the scene we are imaging. This is followed by the light passing through the spectral filter array which can be modeled by a point-wise multiplication with a 3D erasure matrix.

The model also adds a crop function to model the finite physical size of the sensor:

$$B_2(x, y, \lambda) = F(x, y, \lambda) \cdot \mathrm{crop}\ [B_1(x, y, \lambda)] = F_\lambda \cdot \mathrm{crop}\ [H(x, y) * V(x, y, \lambda)].$$

Here, $B_2$ represents the intermediate measurement after the light has passed through the diffuser and the spectral filters and F refers to the spectral filter array matrix. However, this is not the final measurement since the sensor captures a 2D intensity measurement where the contributions for each wavelength can be summed up to result in a 2D measurement. The final measurement B can be written as:

$$B(x, y) = \sum_\lambda B_2(x, y, \lambda) = \sum_\lambda F(x, y, \lambda) \cdot \text{crop } [H(x, y) * V(x, y, \lambda)].$$

Here, B refers to the final measurement on the sensor, which is a 2D intensity measurement.

This forward model is used for reconstruction to solve an inverse problem, which in this case is done by solving an optimization problem. The optimization problem with an imposed native sparsity can be expressed as:

$$\hat{V} = \underset{v}{\arg\min} \left| B - \sum_\lambda F \cdot \text{crop } [H * V] \right|_2^2 + \mu \|V\|_1$$

Here $\hat{V}$ is the solution to this optimization problem to produce the reconstructed scene. A FISTA algorithm is used to solve the optimization problem as discussed above.

The technology described herein may be better understood with reference to the accompanying examples, which are intended for purposes of illustration only and should not be construed as in any sense limiting the scope of the technology described herein as defined in the claims appended hereto.

Example 1

To demonstrate the breadth and functionality of the devices and methods for computational snapshot HSI system microscopy, a module with the architecture illustrated schematically in FIG. 1 was assembled, calibrated and tested on fluorescent samples. The module had a relay lens, a diffuser, and a spectral filter mounted off-center on an imaging sensor without a cover glass. The module was aligned to the output port of a benchtop microscopy (Nikon TE300). A spectral filter array (8×8 filter array with 64 spectral channels, filter size 20 μm) was mounted a board level cover glass-free image sensor (The Imaging Source) with optical adhesive that was hardened under UV light.

A custom optical diffuser was positioned in between the relay and the spectral filter to complete the module. An aperture was formed on the diffuser using black tape, the aperture was sized such that the PSF is significantly larger than a single 8×8 tile on the filter, spanning many such tiles.

The spectral filter matrix was calibrated using a diffraction-grating monochromator (Cornerstone 130) with measurements taken from 350 nm to 900 nm uniformly spaced by 2 nm. It should be noted that the calibration wavelength range depends on the selection of filters.

The diffuser was calibrated by placing a 3-micron fluorescent bead in the sample plane of the microscope. The spectral camera was translated perpendicular to the optical axis to expose the edge of the imaging sensor which did not have the spectral filter to occlude the point spread function. This strategy of leaving part of the image sensor without a spectral filter allows easy calibration of the PSF.

Example 2

In another example, shown in FIG. 2, the imaging module 30 acts as an independent portable hyperspectral microscope consisting of four parts: an objective, a diffuser, a spectral filter, and image sensor. Note, the benchtop microscope is missing altogether. Instead, an off-axis LED can be used to illuminate the samples. The first lens 32 is an objective (Nikon 4x) that directly collects and collimates light from a sample. The collimated light is spatially shaped using the diffuser 38 (Luminit 0.5 degree) to create a caustic pattern. The spectral filter 40 (8×8 filter tile with 450-micron filter size) transmits the light onto the image sensor 44 (Basler board level camera daA1600-60 □m) with the cover glass 42 still in place. The design allows the use of any off the shelf image sensor without needing to remove the cover glass.

The initial calibrated experimental setup used a programmable LED Panel with multicolored (RGB) LEDs as the target object. This allowed easy control of the scene as well as reliable control over the collection of experimental data that also serves as a sparse scene. For the initial reconstructions, the forward model was used without modelling the cover glass in the algorithm. From the initial reconstruction results, it was clear that the spatial localization was working well for our reconstructions. The reconstructed spectrum also matched the ground truth spectrum with reasonably high accuracy Spectral artifacts in the reconstructions were observed as the object is moved to the edges of the FOV, since the cover glass introduces separation between the spectral filters and the sensor, which introduces crosstalk between the light passing through adjacent filters. Due to this separation, the forward model is only approximately true. The model is still accurate for objects that are central to the FOV, however that is not the case for the edges of the FOV, but the spectral filter array cannot be modeled as a point-wise multiplication for objects at the edges of the FOV.

Two methods to obtain faithful reconstructions using the HIS system despite the cover glass were tested. The first of these is an unbiased approach—independent of the sample or application. This method relies on the fact that the pixels that are most affected by the crosstalk are the ones behind the interfaces of adjacent spectral filters. Hence, one can choose to ignore these pixels for the spectral reconstruction for accuracy. Simple geometry can be used to find what fraction of the pixels would be affected by crosstalk in our scene and selectively erased those pixels computationally (in this case it was approximately 30 percent of pixels). Using rudimentary edge filtering and some manual intervention, an erasure grid was formed using a spectral filter matrix. The design choice of using larger filters in our filter array meant that it was possible to successfully reconstruct our scene despite applying an erasure (e.g., discarding part of the measurement).

The second approach was an application-dependent approach. Several applications that employ hyperspectral imaging have a spectral basis, i.e., a discrete set of spectra such that any observed spectral response in the scene is a combination of these basis spectra. For example, in the simple case of the LED panel used in the experiments, all detectable spectral responses are a combination of the red, blue, and green LED spectra. In such scenarios, use of the limited possibilities of spectral create a spectral basis, D. Additional constraint can be imposed in the reconstruction algorithm—that the spectral response of any point in the scene must be some linear combination of the basis spectra.

$$\hat{V} = \underset{v}{\operatorname{argmin}} \left| B - \sum_{\lambda} F \cdot \operatorname{crop}\ [H * V] \right|_2^2 + \mu \|V\|_1 \quad \text{s.t.} \quad DU = V$$

Here, B refers to the 2D measurement on the camera, F refers to the spectral filter array, H refers to the diffuser PSF, V is the scene we want to reconstruct, and D is the spectral dictionary, where each column is a basis spectrum.

The spectral prior's method is recommended for any application where an underlying spectral basis is known beforehand. However, prior knowledge may not be available for a number of HSI applications. The erasure grid method is applicable to a much wider range of applications. However, to use this approach for reconstructions, one must ensure that the filters are large enough so that part of the measurement can be discarded and still reconstruct the scene faithfully.

Reconstructions of fluorescent microscopy scenes using a sensor with a cover glass coupled to a benchtop microscope were conducted.

Example 3

To further demonstrate the capabilities of the snapshot HSI system microscopy, a module with the architecture illustrated schematically in FIG. 3 was assembled. This alternative design for a hyperspectral imaging system is a slight modification of the architecture that relocates the spectral filter array from the sensor plane to the diffuser plane.

The design is simple to fabricate, allows for a free choice of the imaging sensor based on the application for the imaging system, and avoids gluing a spectral filter onto the sensor which is useful for applications with expensive cameras.

This design choice is preferable over Example 2 especially in the case of using cooled scientific CMOS cameras which often have a housing to maintain moisture control and several millimeters of gap between the protective glass and the image sensor pixels.

This design can potentially be a modular attachment that can be coupled into any imaging system to make it an HSI system. This design modification means that a new forward model was necessary. It was assumed that the diffuser behaves as a linear shift invariant (LSI) system since a weakly scattering diffuser was to be used. However, since the spectral filter array was moved right behind the diffuser, the diffuser-filter combination now had a wavelength dependent PSF.

Mathematically it is possible to model the diffuser-filter combination as a 2D convolution with the scene at every wavelength:

$$A(x, y, \lambda) = H\lambda(x, y, \lambda) * V(x, y, \lambda).$$

Here, A is the measurement if the sensor size was infinite, H$\lambda$ refers to the wavelength dependent PSF, and V is the scene we are imaging. We can further understand the nature of H$\lambda$ as a point-wise multiplication of the spectral filter array with the diffuser PSF. In other words, the spectral filter array modifies the PSF at different wavelengths differently based on the response of the filters resulting in a wavelength dependent PSF:

$$H_{\lambda}(x, y, \lambda) = F(x, y, \lambda) \cdot H_1(x, y).$$

Here, F refers to the spectral filter array matrix, and H$_1$ is the wavelength independent PSF of the diffuser. The final measurement is given by:

$$B = \operatorname{crop}\left(\sum_{\lambda} A(x, y, \lambda)\right) = \operatorname{crop}\left(\sum_{\lambda} H(x, y, \lambda)\right) * V(x, y, \lambda),$$

where B is the final measurement captured by the sensor.

The reconstruction uses a forward model to solve an inverse problem to reconstruct the scene. We rely on CS to guarantee convergence of our reconstruction algorithm to the correct solution. In practice we are solving an optimization problem which tries to minimize measurement error along with a native sparsity prior. This optimization problem can be expressed as:

$$\hat{V} = \underset{v}{\operatorname{argmin}} \left| B - \operatorname{crop}\left(\sum_{\lambda} H\lambda * V\right) \right|_2^2 + \mu \|V\|_1.$$

Here $\hat{V}$ is the solution of the optimization problem, the reconstruction hypercube and the FISTA algorithm is used for faster convergence to the solution of the optimization problem.

An apparatus shown schematically in FIG. 3 was assembled from an (8×8 filter array with 64 spectral channels) spectral filter mounted to an optical diffuser (0.5-degree Luminit) and a (BaslerCam AG daA1600-60 µm) imaging sensor and calibrated. The reconstruction algorithm for this alternative HSI system embodiment relies on knowing the know the wavelength dependent PSF H$\lambda$ beforehand to be able to successfully reconstruct the images. The camera structure has a simpler calibration process in that only a single calibration procedure is needed since H$\lambda$ can be calibrated using a calibration setup with a monochromator. A plane wave from a monochromator incident to the setup is used to capture the PSF at different wavelengths. A scan through all the wavelengths of interest was performed and a different measurement is recorded at every wavelength which corresponds to the PSF at that particular wavelength. Finally, all of these measurements were stacked into a single matrix to form H$\lambda$.

Example 4

Another demonstration of the functionality of the apparatus and system was demonstrated with imaging of 30-micron orange and 10-micron green fluorescent beads. The hyperspectral imager of a relay lens, a diffuser, and hyperspectral camera coupled to the side port of a Nikon TE300 epifluorescent microscope with a 4× objective and a blue LED for excitation was used for imaging.

Raw measurements were captured on the sensor that were then fed through the reconstruction algorithm to recover the hyperspectral data cube. The spatial image using false color was matched with the bead positions in an image taken with a regular monochrome camera in the image plane shown. Upon zooming in, the apparatus was able to resolve up to 4 beads within a super pixel.

This configuration performed better in terms of field of view and resolution, than if the spectral camera was placed directly in the image plane. The full spectrum for each point in the scene was observed to closely match the ground truth.

Next, some fixed fluorescent HUVEC cells were imaged with the apparatus. Two cells were picked to zoom in on, which showed that the spectra are similar. They were tagged with CellTracker Green dye. The full ground truth spectrum was not available to compare against but matched with the listed emission peak at 516 nm.

Similarly, the same cell types were tagged with different fluorophores and compared. Upon zooming in, the green, orange, and red cells were fully reconstructed. We can resolve these two red cells next to each other. The spectra matched the ground truth.

Finally, spectrally coded hydrogel beads (50-micron Europium beads) were imaged. These beads were composed of different ratios of lanthanide elements which were excited using ultraviolet light and fluorescence in the visible range. Sharp peaks in the emission spectrum were correctly recovered.

Embodiments of the technology of this disclosure may be described herein with reference to flowchart illustrations of methods and systems according to embodiments of the technology. Embodiments of the technology of this disclosure may also be described with reference to procedures, algorithms, steps, operations, formulae, or other computational depictions, which may be included within the flowchart illustrations or otherwise described herein. It will be appreciated that any of the foregoing may also be implemented as computer program instructions. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored locally to the device in non-transitory media or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms controller, microcontroller, processor, microprocessor, hardware processor, computer processor, central processing unit (CPU), and computer are used synonymously to denote a device capable of executing the instructions and communicating with input/output interfaces and/or peripheral devices, and that the terms controller, microcontroller, processor, microprocessor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An imaging apparatus for snapshot hyperspectral microscopy, the apparatus comprising a lens; a phase mask; a spectral filter array; and an image sensor; wherein the assembly is configured for placement on an output port of a microscope.

The apparatus of any preceding or following implementation, wherein the phase mask is a light shaping diffuser with linear shift invariance.

The apparatus of any preceding or following implementation, wherein the assembly is used on its own as an imager without an external microscope.

The apparatus of any preceding or following implementation, wherein the spectral filter array is mounted to the image sensor.

The apparatus of any preceding or following implementation, the image sensor further comprising a cover glass, the spectral filter array mounted to the cover glass.

The apparatus of any preceding or following implementation, wherein the spectral filter array is mounted to the phase mask.

The apparatus of any preceding or following implementation, wherein the phase mask spreads out light from each point in an original image plane such that the light passes through multiple spectral filters on the image sensor.

The apparatus of any preceding or following implementation: wherein a point spread function is created; and wherein the point spread function has a sharp auto correlation that can be used to recover a higher resolution spectral data cube.

The apparatus of any preceding or following implementation, wherein a detected measurement is fed through an algorithm to solve an inverse problem to recover a hyperspectral data cube.

The apparatus of any preceding or following implementation, further comprising a computer processor coupled to the image sensor.

A snapshot hyperspectral microscopy imaging system, comprising: (a) a light microscope with an output port; (b) an imaging module optically coupled to the output port, the module comprising: (i) a relay lens; (ii) a phase mask positioned within a Fourier plane of the microscope; (iii) a spectral filter array; and (iv) a camera sensor.

The system of any preceding or following implementation, wherein the spectral filter array is mounted to the camera sensor.

The system of any preceding or following implementation, the camera sensor further comprising a cover glass, the spectral filter array mounted to the cover glass.

The system of any preceding or following implementation, wherein the spectral filter array is mounted to the phase mask.

The system of any preceding or following implementation, further comprising: (a) a computer processor; and (b) a non-transitory computer-readable memory storing instructions executable by the computer processor; (c) wherein the instructions, when executed by the computer processor, perform steps comprising: (i) acquiring a plurality of snapshot hyperspectral data of a scene; and (ii) processing the acquired hyperspectral data with through an algorithm to recover a hyperspectral data cube; (d) wherein the relay lens relays the Fourier plane from the microscope onto the diffuser that encodes the spatial information in a scene; and (e) wherein the spectral filter array encodes the spectral information in the scene.

The system of any preceding or following implementation, wherein the acquired hyperspectral data is processed with a compressed sensing algorithm and an optimization algorithm to reconstruct a 3D hypercube from a 2D intensity measurement.

The system of any preceding or following implementation, the instructions further comprising, controlling a pattern diameter produced by the phase mask on the spectral filter array.

The system of any preceding or following implementation, wherein the phase mask is a light shaping diffuser with linear shift invariance.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "substantial", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

All text in a drawing figure is hereby incorporated into the disclosure and is to be treated as part of the written description of the drawing figure.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An imaging apparatus for snapshot hyperspectral microscopy, the apparatus comprising:
   a lens;
   a phase mask;
   a spectral filter array; and
   an image sensor;
   wherein the phase mask spreads out light from each point in an original image plane such that the light passes through multiple spectral filters on the image sensor;

wherein a point spread function is created; and
wherein the point spread function has a sharp auto correlation that can be used to recover a higher resolution spectral data cube.

2. The apparatus of claim 1, wherein the assembly is configured for placement on an output port of a microscope.

3. The apparatus of claim 1, wherein said phase mask is a light shaping diffuser with linear shift invariance.

4. The apparatus of claim 1, wherein said spectral filter array is mounted to the image sensor.

5. The apparatus of claim 1, said image sensor further comprising a cover glass, said spectral filter array mounted to said cover glass.

6. The apparatus of claim 1, wherein said spectral filter array is mounted to the phase mask.

7. The apparatus of claim 1, wherein a detected measurement is fed through an algorithm to solve an inverse problem to recover a hyperspectral data cube.

8. The apparatus of claim 1, further comprising a computer processor coupled to the image sensor.

9. A snapshot hyperspectral microscopy imaging system, comprising:
   (a) a light microscope with an output port;
   (b) an imaging module optically coupled to the output port, the module comprising:
      (i) a relay lens;
      (ii) a phase mask positioned within a Fourier plane of the microscope;
      (iii) a spectral filter array; and
      (iv) a camera sensor;
   (c) wherein the phase mask spreads out light from each point in an original image plane such that the light passes through multiple spectral filters on the image sensor;
   (d) wherein a point spread function is created; and
   (e) wherein the point spread function has a sharp auto correlation that can be used to recover a higher resolution spectral data cube.

10. The system of claim 9, wherein said spectral filter array is mounted to the camera sensor.

11. The system of claim 9, said camera sensor further comprising a cover glass, said spectral filter array mounted to said cover glass.

12. The system of claim 9, wherein said spectral filter array is mounted to the phase mask.

13. The system of claim 9, wherein said phase mask is a light shaping diffuser with linear shift invariance.

14. The system of claim 9, further comprising:
   (a) a computer processor; and
   (b) a non-transitory computer-readable memory storing instructions executable by the computer processor;
   (c) wherein the instructions, when executed by the computer processor, perform steps comprising:
      (i) acquiring a plurality of snapshot hyperspectral data of a scene; and
      (ii) processing the acquired hyperspectral data with through an algorithm to recover a hyperspectral data cube;
   (d) wherein the relay lens relays the Fourier plane from the microscope onto the diffuser that encodes the spatial information in a scene;
   (e) wherein the spectral filter array encodes the spectral information in the scene; and
   (f) wherein the acquired hyperspectral data is processed with a compressed sensing algorithm and an optimization algorithm to reconstruct a 3D hypercube from a 2D intensity measurement.

15. The system of claim 14, said instructions further comprising:

controlling a pattern diameter produced by the phase mask on the spectral filter array.

16. The system of claim 14, said instructions further comprising:

applying an algorithm to a detected measurement to solve an inverse problem to recover a hyperspectral data cube.

* * * * *